No. 855,006. PATENTED MAY 28, 1907.
M. R. JENKINS.
HAY RAKE.
APPLICATION FILED FEB. 2, 1907.
2 SHEETS—SHEET 1.
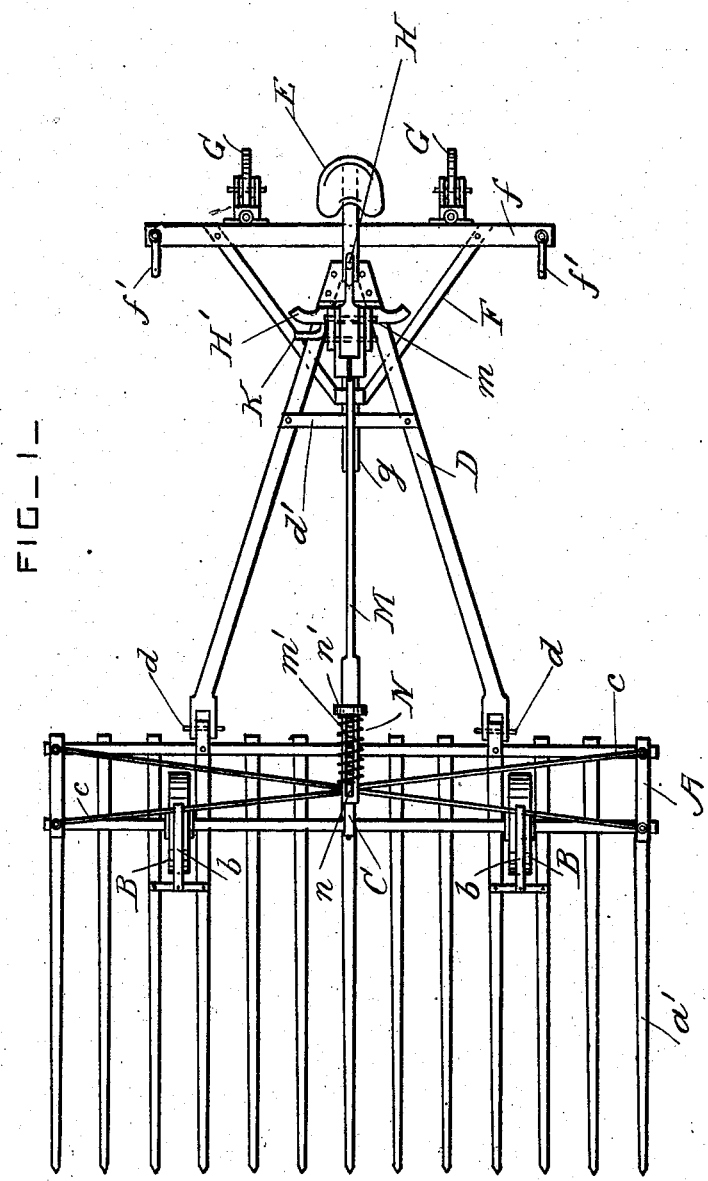
WITNESSES: INVENTOR
Marion R. Jenkins
By Herbert W. Jenner
Attorney No. 855,006. PATENTED MAY 28, 1907.
M. R. JENKINS.
HAY RAKE.
APPLICATION FILED FEB. 2, 1907.
2 SHEETS—SHEET 2.
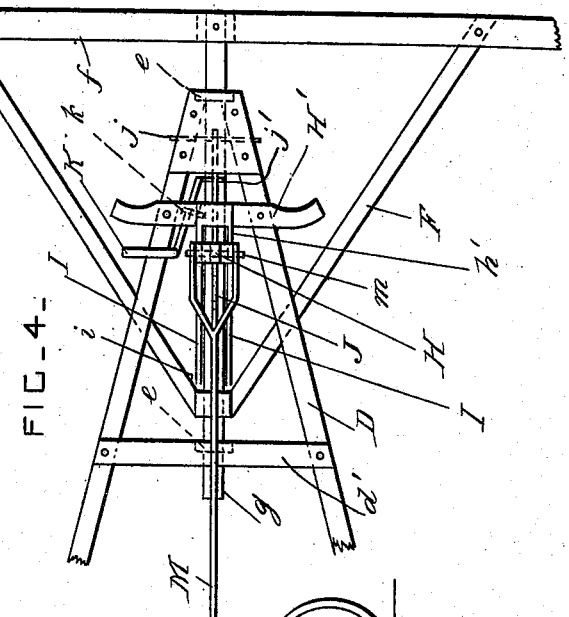
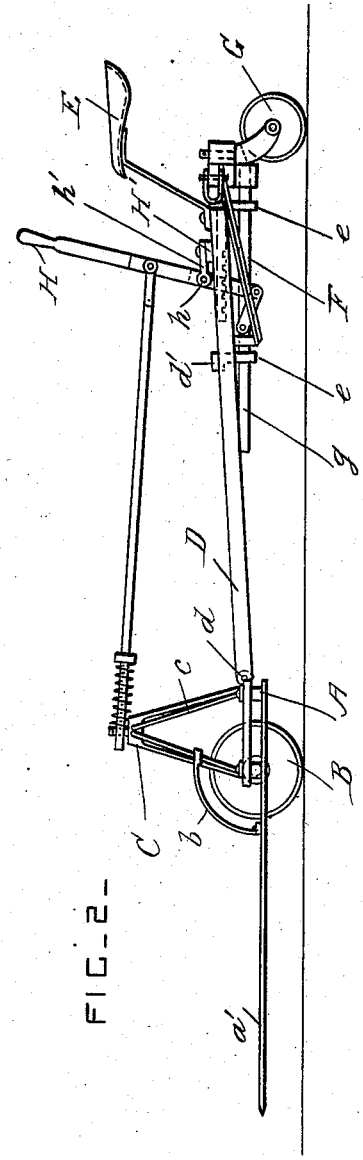
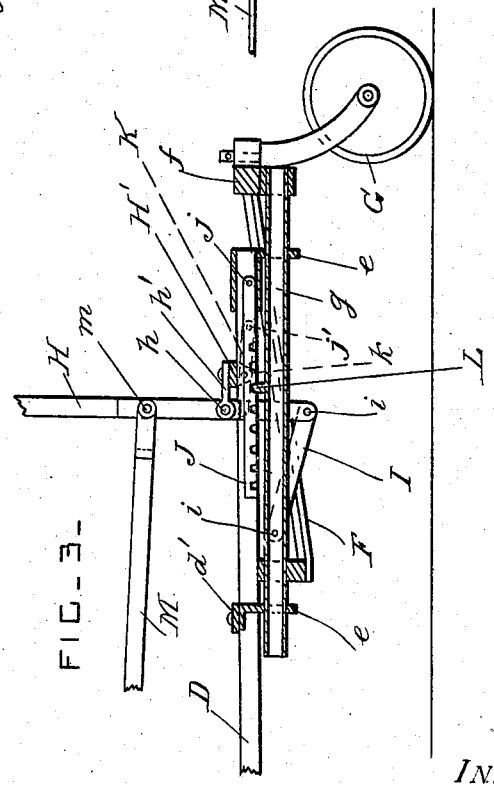
WITNESSES:  INVENTOR
  Marion R. Jenkins
BY
  Herbert W. Jenner.
    Attorney

UNITED STATES PATENT OFFICE.

MARION R. JENKINS, OF BROWNING, MISSOURI.

HAY-RAKE.

No. 855,006.  Specification of Letters Patent.  Patented May 28, 1907.

Application filed February 2, 1907. Serial No. 355,484.

*To all whom it may concern:*

Be it known that I, MARION R. JENKINS, a citizen of the United States, residing at Browning, in the county of Linn and State of Missouri, have invented certain new and useful Improvements in Hay-Rakes; and I do hereby declare the following to be a full, clear, and exact description of the invention, such as will enable others skilled in the art to which it appertains to make and use the same.

This invention relates to hay-rakes which are propelled by horses hitched to a draft-attachment frame arranged at the rear end of the main frame of the rake; and it consists in the novel construction and combination of the parts hereinafter fully described and claimed whereby the draft-attachment frame and main frame are pivotally and flexibly connected together.

In the drawings, Figure 1 is a plan view of the rake. Fig. 2 is a side view of the rake. Fig. 3 is a longitudinal section through the draft-attachment frame and the rear part of the main frame drawn to a larger scale. Fig. 4 is a plan view of the parts shown in Fig. 3.

A is the rake-head provided with tines $a'$.

B are the ground supports or ground wheels which support the rake-head. These wheels are preferably arranged between two of the tines of the rake-head, and they are provided with guards $b$ to keep the hay from resting on them.

C is an upwardly-projecting arm or bracket at the middle of the rear part of the rake-head, and $c$ are truss-rods which connect the top part of the said arm with the end portions of the rake-head.

D is the main frame of the rake which is pivoted to the rake-head by pins $d$. The side bars of the main frame converge and have their rear ends secured together at an acute angle.

E is a seat for the driver supported by the rear end portion of the main frame.

F is the draft-attachment frame which is provided with a draft-bar $f$ at its rear end, and $f'$ are clevises at the end portions of the draft-bar for the attachment of the draft animals. These animals are preferably arranged between the draft-bar and the rake-head, one on each side of the main frame.

G are two caster wheels or ground supports pivotally supported from the draft-bar $f$. These caster wheels run on the ground and take the weight of the draft-attachment frame and the rear part of the main frame.

The draft-attachment frame is preferably triangular in form, and it is provided with a longitudinal guide-bar $g$ at its middle part which is preferably made tubular for lightness. The main frame D has bearings $e$ at its rear end portion which are pivoted on the guide-bar $g$, and which are also slidable longitudinally on the said guide-bar. The foremost of these two bearings $e$ is secured to a cross-bar $d'$ on the main frame.

H is a hand-lever which is pivoted by a pin $h$ to a bracket $h'$ carried by the foot-bar or cross-bar H' which is secured to the main frame in front of the driver's seat. The lower end portion of the lever H is forked so as to straddle the guide-bar $g$, and it is pivotally connected with the said guide-bar by links I and pins $i$.

J is a notched locking-bar which is pivoted to the rear end portion of the main frame by a pin $j$, and which extends forwardly over the guide-bar.

K is a trip or foot-lever the middle part of which is pivoted by a pin $k$ to a lug on the underside of the foot-bar H'. The rear part of the foot-lever is pivoted to the locking-bar J by a pin or projection $j'$.

L is a locking-catch which projects upward from the middle part of the guide-bar $g$, and which engages with the notched locking-bar.

M is the reach-bar the rear end of which is pivoted by a pin $m$ to the hand-lever. The front end portion of the reach-bar is provided with a slot $m'$ which is slidable over a projection $n$ at the top of the arm C of the rake-head. N is a spring arranged between the said projection $n$ and a collar $n'$ on the reach-bar, and pressing the projection forward in the slot $m'$.

The driver can raise or lower the points of the tines of the fork by means of the hand-lever and the foot-lever, from his position on the seat, and can lock them in any desired position.

As the two frames are pivotally connected by the guide-bar and the bearings $e$, each frame can rock independent of the other in passing over rough ground and obstructions, and no twisting strains are thrown upon either frame, which is a very great advantage as the frame-work can be made much lighter.

When the tines of the fork are raised clear of the ground to carry a load of hay, they are depressed automatically by the weight of the hay above them when the foot-lever is depressed so as to release the locking-bar from the catch. When the tines are resting on the ground they are raised automatically by the pull of the horses when the foot-lever is depressed, so that the hand-lever does not ordinarily have to be operated by manual force. The spring on the reach-bar enables the tines to pass over stones without transmitting any pitching movement to the frames.

What I claim is:

1. In a hay-rake, the combination, with a draft-attachment frame, of a main frame pivoted longitudinally to the said frame so that each frame can rock pivotally and independent of the other, and a rake-head carried by the said main frame.

2. In a hay-rake, the combination, with a draft-attachment frame, of a pivot-bar secured to the said frame and arranged on the longitudinal axis of the machine, a main frame provided with bearings which are pivoted upon the said bar so that each frame can rock pivotally and independent of the other on the said pivot-bar as an axis, and a rake-head carried by the said main frame.

3. In a hay-rake, the combination, with a draft-attachment frame, of a main frame slidably and pivotally connected with the said frame so that each said frame can slide longitudinally and rock pivotally and independent of the other, a rake-head carried by the said main frame and provided with an upwardly-projecting arm, a reach-bar having its front end connected to the said arm, and intermediate connections between the two said frames and the rear end portion of the said reach-bar.

4. In a hay-rake, the combination, with a draft-attachment frame, of a longitudinal guide-bar secured to the said frame, a main frame provided with bearings which slide on the said guide-bar, a lever pivotally connected with the two said frames, a rake-head carried by the said main frame and provided with an upwardly-projecting arm, and a reach-bar operatively connected to the said arm and lever.

5. In a hay-rake, the combination, with a draft-attachment frame, of a main frame slidably connected with the said frame, a rake-head connected to the said main frame and provided with an upwardly-projecting arm, a reach-bar having its rear end portion operatively connected with the said frames, and a slidable spring-controlled connection between the front end part of the said reach-bar and the said arm.

6. In a hay-rake, the combination, with a draft-attachment frame, of a longitudinal guide-bar secured to the said frame and provided with a catch, a main frame provided with bearings which slide on the said guide-bar, a lever pivotally connected with the two said frames, a locking-bar pivoted to the said rear frame and engaging with the said catch, a trip for disengaging the said locking-bar from the said catch, a rake-head carried by the said main frame and provided with an upwardly-projecting arm, and a reach-bar connected to the said arm and lever.

7. In a hay-rake, the combination, with a rake-head provided with two ground wheels, of a frame for propelling the said rake-head also provided with two ground wheels and means for pivotally connecting the said rake-head and frame so that each may rock with respect to the other upon a longitudinal axis.

8. In a hay-rake, the combination, with a rake-head provided with two ground wheels, of a frame for propelling the said rake-head, said frame being formed in two sections, means for pivotally connecting the said sections so that each may rock with respect to the other upon a longitudinal axis, and two ground wheels carried by the rear section of the said frame and arranged at the opposite end of the said frame from the said rake-head.

In testimony whereof I have affixed my signature in the presence of two witnesses.

MARION R. JENKINS.

Witnesses:
   JOHN R. SEVIER,
   JAMES P. BOLLING.